US006212921B1

(12) United States Patent
Knighton

(10) Patent No.: US 6,212,921 B1

(45) Date of Patent: Apr. 10, 2001

(54) LOCKING DEVICE FOR PORTABLE COMPUTERS

(76) Inventor: William W. Knighton, 7831 Pit Rd., Wausau, WI (US) 54403

(*) Notice: Subject to any disclaimer, the term of this patent is extended or adjusted under 35 U.S.C. 154(b) by 0 days.

(21) Appl. No.: 09/298,520

(22) Filed: Apr. 23, 1999

(51) Int. Cl.[7] ..................... G05B 73/00

(52) U.S. Cl. ..................... 70/58; 70/62; 248/551

(58) Field of Search ..................... 70/14, 19, 57, 70/58, 62, 158, 163, 164, 167–169, 461; 109/50, 52; 248/551, 553; 312/223.2, 265.5, 265.6

(56) References Cited

U.S. PATENT DOCUMENTS 3,410,122 * 11/1968 Moses .
4,028,913 * 6/1977 Falk ..................... 70/58
4,031,721 * 6/1977 Anderson ..................... 70/58
4,696,449 * 9/1987 Woo et al. ..................... 248/553
5,052,199 10/1991 Derman .
5,052,651 10/1991 Guddee .
5,076,079 * 12/1991 Monoson et al. ..................... 70/58
5,169,114 * 12/1992 O'Neill ..................... 248/551
5,361,610 11/1994 Totelock .
5,660,451 * 8/1997 Glynn ..................... 70/58
5,692,722 * 12/1997 Lundagaårds ..................... 248/553
5,724,225 * 3/1998 Hrusoff et al. .
5,816,076 * 10/1998 Bledermann et al. ..................... 70/58
5,836,183 * 11/1998 Derman ..................... 70/58
5,857,568 * 1/1999 Speirs .
5,914,461 * 6/1999 Brandt ..................... 70/58
6,138,483 * 10/2000 Galant ..................... 70/58

* cited by examiner

*Primary Examiner*—Darnell M. Boucher
(74) *Attorney, Agent, or Firm*—Jeffrey D. Moy; Harry M. Weiss; Weiss & Moy, P.C.

(57) ABSTRACT

A locking apparatus for providing security for either unauthorized access or unauthorized removal of portable computers. The portable computer sets on a base tray that has side and rear walls with access ports. A combined assembly of a removable locking member and an adjustable security member fits snugly over the top surface of the computer. The combined assembly is secured to the rear wall of the base tray by a flange and to the front of the base tray by a locking mechanism.

22 Claims, 2 Drawing Sheets

LOCKING DEVICE FOR PORTABLE COMPUTERS

BACKGROUND OF THE INVENTION

1. Field of the Invention

This invention relates generally to security of portable computers. Specifically, this invention relates to locking device for computers, which may be permanently secured to a permanent structure such as a desk, a computer credenza, an articulating arm or other types of permanent structures. The computer may be installed or removed from the locking device at the discretion of those having access to the security features of the locking device.

2. Description of the Related Art

Portable computers, particular the class of portable computers referred to as notebook computers, have the advantage of being compact and light weight and therefore easily transportable. However, the disadvantage of these relative small computers is that they may be subject to unauthorized removal or acquisition.

In the prior art, locking devices for computers, including portable computers, served to provide security for the devices in the absence of the computer owner or other authorized persons. However, the prior art devices were often cumbersome from the perspective of ease of installation and removal of the computer from the locking device. Also, the prior art locking devices did not have the flexibility to adjust to portable computers of different dimensions.

One such prior art computer security device which is indicative of the limitations noted above is U.S. Pat. No. 5,052,199 (Derman). Derman discloses a clamp locking device for personal computers. The Derman device is essentially a large base frame with threaded rods which grip a desk top personal computer chassis from several sides. Installation and removal of the personal computer from the Derman device requires partial disassembly of the device, the use of a wrench to tighten or untighten the threaded rods, and manipulation of sliding bars to allow or prohibit access to the threaded rods. The Derman device is restrictive in that it is designed to fit a personal computer chassis with a specific footprint, i.e. dimensions.

Another computer security device can be found in U.S. Pat. No. 5,052,651 (Guddee). The Guddee device is even more complicated that the Derman device in that installation and removal of the personal computer requires the virtual dismantling of the fastener. The fastener is a complex assortment of frame, locking bars, rails, connecting pins, rods and posts, bolts and other numerous components. Furthermore, the Guddee device, similar to the Derman device is designed to fit a standard personal computer chassis and therefore lacks the flexibility to accommodate portable devices of different dimensions.

Still another type of locking device for computers is found in U.S. Pat. No. 5,361,610 (Sanders). The Sanders device is characterized by a plate assembly which is inserted into the floppy disk drive of the computer. A standard padlock and cable combination secures the plate assembly, and thus the computer, to a permanent object such as a table or desk. The disadvantage of this approach is that no security is provided with respect to access of the computer including keyboard, hard drive, modem, display, RAM, etc. Furthermore, the security of the Sanders device is easily defeatable by means of nothing more than wire clippers for snipping the cable.

Therefore, a solution to the limitations imposed by the prior art devices was needed to provide a portable computer security device with convenient installation and removal, the capability of accommodating more than one size portable computer and means for limiting access to the operation of the computer.

BRIEF SUMMARY OF THE INVENTION

It is an object of the present invention to provide a locking device for portable computers which prevents unauthorized removal of the portable computer from a permanent structure or a work area.

It is another object of the present invention to provide a locking device for portable computers which prevents unauthorized access of the portable computer by individuals.

It is another object of the present invention to secure the locking device to a permanent structure such as a desk, computer credenza or computer work station having an articulating arm.

It is another object of the present invention that the locking device be adjustable to provide security of portable computers having a plurality of different outside dimensions.

It is still another object of the present invention that the locking device facilitate rapid installation and removal of the portable computer.

In accordance with one embodiment of the present invention, a locking device for portable computers comprises a base tray, a removable locking member coupled to the base tray and an adjustable security member coupled to the removable locking member.

In accordance with another embodiment of the present invention, a locking device for portable computers comprises a base tray comprising a top and bottom surface; a removable locking member coupled to the base tray, the removable locking member comprising a locking mechanism and a horizontal section coupled to the locking mechanism that is parallel to the top surface of the base tray; and an adjustable security member coupled to the removable locking member, the adjustable security member comprising a horizontal retainer section that is parallel to both the top surface of the base tray and the horizontal section of the removable locking member wherein the horizontal retainer section of the adjustable security member is situated in between the base tray and the horizontal section of the removable locking member.

In another embodiment a method for securing a portable computer to a locking device comprises the steps of providing a base tray comprising: a top surface, a bottom surface, at least one side wall and at least one rear wall; coupling the bottom surface of the base tray to a permanent structure; placing the portable computer on the top surface of the base tray; providing a combined assembly comprising: an adjustable security member and a removable locking member coupled to the adjustable security member; setting an adjustment height for the adjustable security member; coupling a rear section of the combined assembly to the at least one rear wall of the base tray; coupling a front section of the combined assembly to the base tray; and locking the front section of the combined assembly to the base tray.

The foregoing and other objects, features, and advantages of the invention will be apparent from the following, more particular, description of the preferred embodiments of the invention, as is illustrated in the accompanying drawings.

DETAILED DESCRIPTION OF THE INVENTION

Figure 1:
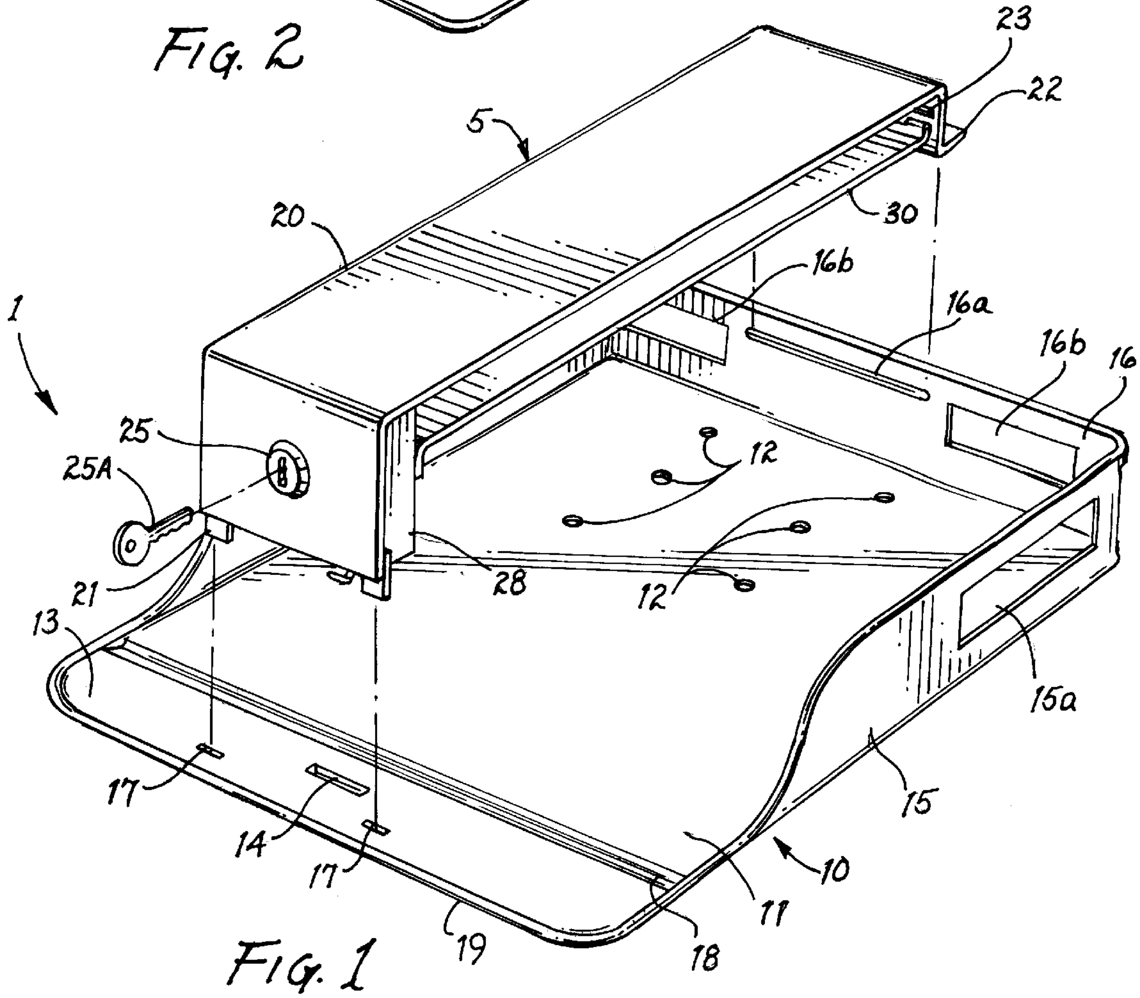
FIG. 1 is a perspective view of the present invention showing the combined assembly of the removable locking member and adjustable security member detached from the base tray. This is a typical configuration prior to securing the portable computer to the device.

Referring to FIG. 1, a locking device 1 for a notebook computer is illustrated comprising a base tray 10, a removable locking member 20 and an adjustable security member 30. FIG. 1 shows the combined assembly 5 of the removable locking member 20 and the adjustable security member 30 detached from the base tray 10. The adjustable security member 30 is couple to the removable locking member 20. Thus, the adjustable security member 30 is decoupled from the base tray 10 upon detaching the combined assembly 5.

The base tray 10 is comprised of a mounting plenum 11 for mounting the locking device 1 to a permanent structure (not shown) such as a computer desk, credenza or articulating arm. The mounting plenum 11 has a plurality of apertures 12 for facilitating the fastening of the locking device 1 to a permanent structure.

The mounting plenum 11 has top and bottom surfaces, the top surface being shown in FIG. 1. The bottom surface (not shown) of the mounting plenum 11 makes contact with the permanent structure. Fasteners, such as screws, bolts, or the equivalent, inserted via the apertures 12, serve to couple the locking device 1 to the permanent structure. The top surface of the mounting plenum 11 is the surface upon which the notebook computer 2 (shown in FIG. 2) is located.

Figure 2:
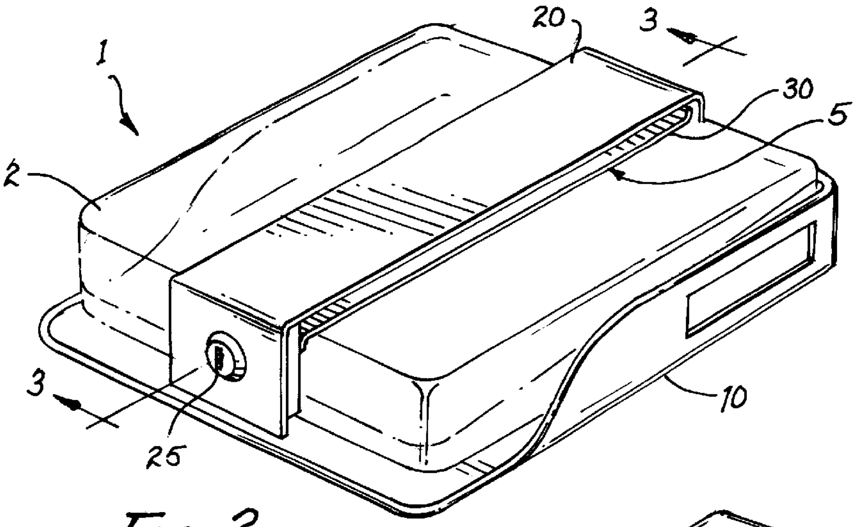
FIG. 2 is a perspective view of the present invention showing a portable computer seated on the base tray of the locking device and the combined assembly of the removable locking member and adjustable security member secured and locked to the base tray thereby preventing unauthorized access or removal of the portable computer.

The base tray 10 is further comprised of an extension plenum 13. The extension plenum 13 has several functions. The extension plenum 13 has a plurality of apertures 17 for receiving the guide pins 21 of the removable locking member 20. The extension plenum 13 also provides a receiving chamber 14 for a locking arm (not shown). Also, the extension plenum 13 extends beyond the keyboard edge of the notebook computer 2 as shown in FIG. 2 and thus can serve as a handrest for the computer operator. The extension plenum 13 is coupled to the mounting plenum 11 by means of a reinforcement channel 18.

The base tray 10 is further comprised of two vertical side walls 15 (one side wall shown) and a vertical back wall 16. The vertical side walls 15 preclude unauthorized removal of the portable computer when the locking device is in a secured state, with the combined assembly 5 of the removable locking member 20 and adjustable security member 30 in place, as shown in FIG. 2. When the removable locking member 20 and the adjustable security member 30 are detached so that the portable computer may be operated, the vertical side walls 15 serve as a retention structure which maintains the portable computer from inadvertently slipping sideways off the locking device 1. Each of the vertical sidewalls 15 have at least one aperture 15*a* for accessing the portable computer components such as input/output (I/O) ports, power receptacles and switches.

The vertical back wall 16 has a locking aperture 16*a* which serves as a receptacle for the removable locking member 20. The vertical back wall 16 also has at least one aperture 16*b*, which similar to the sidewall apertures 15*a*, permit the access of portable computer components such as input/output (I/O) ports, power receptacles and switches. The vertical back wall 16 also prevents the portable computer from inadvertently slipping off the rear of the locking device 1 when the removable locking member 20 and the adjustable security member 30 are detached from the base tray 10 for computer operation.

The vertical side walls 15, the vertical back wall 16 and the extension plenum 13 have a contiguous tubular shaped rail 19 on the exposed perimeter of these components. The tubular shaped rail 19 functions to cover any acute or sharp edges present in the unfinished portions of the vertical side walls 15, the vertical back wall 16 and the extension plenum 13.

Figure 3:
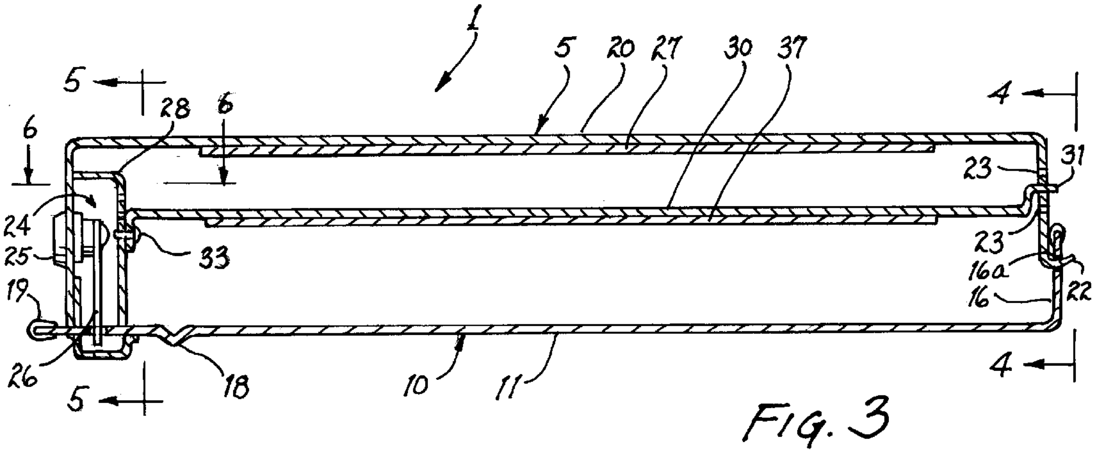
FIG. 3 is a cross sectional view of the present invention illustrating the interconnection of the three primary components, i.e. the base tray, the removable locking member and the adjustable security member. Also shown are the internal components of the locking mechanism which include the key operated lock and the locking arm.

The locking device 1 is also comprised of the removable locking member 20. The removable locking member 20 is formed with a variety of angles to conform with the general shape of the portable computer and the security features of the locking device 1. The rear section of the removable locking member 20 has a flange 22 for insertion into the locking aperture 16*a* when securing the personal computer. In the preferred embodiment the flange 22 is hook shaped as shown in FIG. 3.

Figure 4:
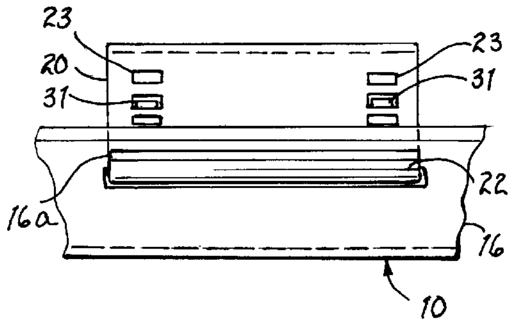
FIG. 4 is a rear view of portions of the base tray, the removable locking member and the adjustable security member. This figure illustrates the rear interconnection between the adjustable security member and the removable locking member as well as the interconnection between the removable locking member and the base tray.

The removable locking member 20 also has a rear vertical section with a plurality of apertures 23 for receiving the adjustable security member 30. In the preferred embodiment, these apertures 23 are set in two columns of rectangular apertures. Each column has several apertures which are equally spaced. In FIG. 4, it can be seen that the spacing of the between the columns of apertures 23 corresponds to the spacing between the flanges 31 of the adjustable security member 30.

The front section of the removable locking member 20 includes the guide pins 21 and the lock mechanism housing 28. The insertion of the guide pins 21 into the apertures 17 align the combined assembly 5 with the base tray 10 during installation.

The lock mechanism housing 28 has several functions. One of which is to protect the locking mechanism from tampering or unauthorized access. As shown in FIG. 1, the visible portion of the locking mechanism is the key operated lock 25. The locking mechanism will be discussed in detail below. Another function of the lock mechanism housing 28 is to provide support for coupling the adjustable security member 30 to the removable locking member 20.

The rear section of the removable locking member 20 is coupled to the front section by means of a horizontal section. When the removable locking member is coupled to the base tray 10, the horizontal section is parallel to the top surface of the base tray 10.

The adjustable security member 30 is an angled device that is connected to the removable locking member 20 in the following manner. The rear section of the adjustable security member 30 has a plurality of flanges 31 that are inserted into a group of the apertures 23 of the rear section of the removable security member 20. The apertures 23 are spaced apart so that the height of the bottom surface of the horizontal retainer section of the adjustable security member 30, i.e. the horizontal portion which connects the front and rear sections of the adjustable security member 30 and which also contacts or retains the portable computer, with respect to the top surface of the base tray 10 may be properly set to compensate for the height of the portable computer when the portable computer is in a closed and stowed position.

Figure 5:
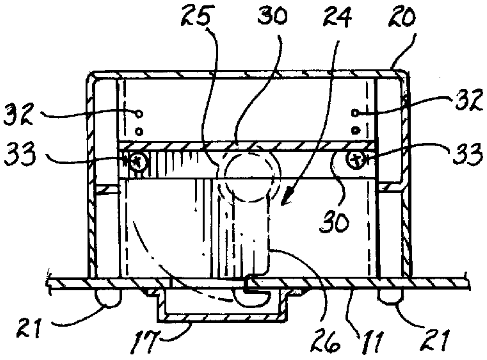
FIG. 5 is a across sectional view of forward portions of the interconnection between the removable locking member and the adjustable security member. Portions of the locking mechanism and the receiving chamber are also shown.

The front section of the adjustable security member 30 has a vertical section with a plurality of apertures 32 (shown in FIG. 5). The purpose of the apertures 32 is for fastening the adjustable security member 30 to the removable locking member 20. In the preferred embodiment, there are two columns of equally spaced apertures 32 and the adjustable security member 30 is fastened by means of screws inserted into the apertures 32, however, other types of fasteners may accomplish substantially the same result.

Similar to the removable locking member 20, the rear section of the adjustable security member 30 is coupled to the front section by means of a horizontal retainer section. When the adjustable security member 30 is coupled to the removable locking member 20, the horizontal retainer section is parallel to the top surface of the base tray 10 and to the horizontal section of the removable locking member 20. The horizontal retainer section makes contact with the top surface of the portable computer (see FIG. 2).

For the adjustable security member 30 to be set to the proper height, the height of the personal computer must be either known, measured or estimated. The rear flanges of the adjustable security member 30 are inserted into the proper apertures 23. Then the vertical front section of the adjustable security member 30 is fastened to the removable locking member 30 as described above. The height of the adjustable security member 30 may be adjusted by reversing and repeating this procedure until the proper setting is accomplished.

FIG. 2 is a perspective view of the locking device 1 with a typical portable computer 2 in the locked and secure position. The portable computer is placed on the top surface of the base tray 10. The adjustable security member 30 has been properly adjusted to fit snugly over the top surface of the portable computer 2 when the combined assembly 5 of the removable locking member 20 and the adjustable security member 30 is placed in position. The locking mechanism has been engaged to preclude unauthorized access or removal of the portable computer 2.

FIG. 3, wherein like numerals correspond to like elements, is a cross sectional view of the locking device 1 which shows the interconnection of the three primary components, i.e. the base tray 10, the removable locking member 20 and the adjustable security member 30. Also shown are the internal components of the locking mechanism 24 which include the key operated lock 25 and the locking arm 26.

The rear flanges 31 of the adjustable security member 30 are inserted into the proper apertures 23 of the removable locking member 20. The vertical front section of the adjustable security member 30 is connected to the lock mechanism housing 28 portion of the removable locking member 20 by fasteners 33. The proper height or clearance of the adjustable security member 30 with respect to the portable computer (not shown) is determined by the connection of the rear and front sections of the adjustable security member 30 to the removable locking member 20.

The cushion material 37, preferably comprised of polyurethane or other resilient material, is coupled to the lower surface of the horizontal retainer section of the adjustable security member 30 typically by means of an adhesive. The cushion material 37 provides a buffer between the adjustable security member 30 and the portable computer. A similar cushion material 27 is coupled to the lower horizontal surface of the removable locking member 20.

The rear hook shaped flange 22 of the removable locking member 20 is inserted into the locking aperture 16*a* of the back wall 16 of the base tray 10. The front section of the removable locking member 20 is secured to the extension plenum 13 of the base tray 10 by means of the locking mechanism 24.

The locking mechanism 24 is comprised of a key operated lock 25 and a locking arm 26. The locking arm 26 is coupled to the rear section of the key operated lock 25. When the key 25*a* (FIG. 2) is inserted into the key operated lock 25, rotation of the key 25*a* results in a rotating or swiveling movement of the locking arm 26. The movement of the locking arm circumscribes an arc of approximately 90 degrees. The lock mechanism housing 28 protects against tampering of the locking mechanism 24.

The key operated lock 25 is a two position lock. In one position as shown in FIGS. 3 and 4, the locking arm is vertical and engages the extension plenum 13 at the receiving chamber 14. This is the locked position for the device 1. When in the locked position, a notch in the locking arm prevents the removal of the combined assembly 5 of the removable locking member 20 and the adjustable security member 30 from the base tray 10.

In a second position (not shown), the locking arm is rotated or swiveled to a horizontal position, i.e. 90 degrees from the locked position and parallel to the extension plenum 13. This is the unlocked position for the device 1. When in the unlocked position the locking arm 26 does not make contact with the base tray 10 or any of its components. In the unlocked position, the combined assembly 5 of the removable locking member 20 and the adjustable security member 30 may be removed or detached from the base tray 10. The key 25*a* may be removed from the key operated lock 25 only when the key operated lock 25 is in either the locked or unlocked positions. The key 25*a* may not be removed from the key operated lock 25 when the locking arm 26 is at some intermediate position between the locked position and the unlocked position.

Referring to FIG. 4, wherein like numerals represent like elements, the rear view of sections of the base tray 10, removable locking member 20 and the adjustable security member 30 are shown. FIG. 4 illustrates the insertion of the adjustable security member flanges 31 into the apertures 23 of the rear section of the removable security member 20. In the preferred embodiment, the apertures 23 are constructed as two columns of equally spaced apertures. The distance between the columns corresponds to the distance between the adjustable security member flanges 31. The rear height of the adjustable security member 30 is determined by inserting the flanges 31 into the appropriate set of apertures 23.

Also, illustrated in FIG. 4 is the interconnection between the removable locking member 20 and the rear wall 16 of the base tray 10. FIG. 4 shows the flange 22 of the removable locking member 20 inserted into the locking aperture 16*a* of the rear wall 16 of the base tray 10.

Referring to FIG. 5, wherein like numerals represent like elements, the rear view of sections of the removable locking member 20, the adjustable security member 30, the locking mechanism 24 and the receiving chamber 17 are shown. FIG. 5 illustrates the locking mechanism 24, including the key operated lock 25 and the locking arm 26 in the locked position, i.e. guide pins 21 seated in the extension plenum 11 and locking arm 26 within the receiving chamber 17 and engaging the extension plenum 11 via an aperture in the extension plenum 11. The receiving chamber 17 prevents tampering of the locking mechanism 24 such as forced disengagement of the locking arm 26 from the extension plenum 11.

Also illustrated in FIG. 5 is the interconnection between the removable locking member 20 and the adjustable security member 30. The removable locking member 20 has a series of apertures 32, on each side and equally spaced, for accepting a fastening device such as a screw or bolt 33. The adjustable security member also has apertures with correspond with those of the removable locking member 20. The positioning of the adjustable security member 30 with the removable locking member 20 is determined by fastening the adjustable security member 30 with a fastening device 33 to the appropriate series of apertures 32 of the removable locking member 20.

Figure 6:
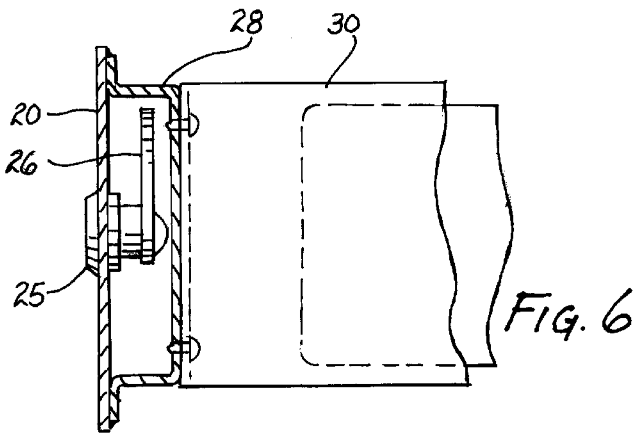
FIG. 6 is a top cross sectional view of the locking mechanism and the interconnection between the adjustable security member and the lock mechanism housing of the removable locking member.

Referring to FIG. 6, a top cross sectional view of the 14 removable locking member 20, the adjustable security member 30 and the locking mechanism 24 is illustrated. The key operated lock 25 is coupled to the front section of the removable locking member 20. The adjustable security member 30 is shown connected to the rear section of the lock mechanism housing 28. The locking arm 26 is shown in the unlocked position, i.e. parallel to and disengaged from the extension plenum (not shown).

Although the invention has been particularly shown and described with reference to a preferred embodiment thereof, it will be understood by those skilled in the art that changes in form and detail may be made therein without departing from the spirit and scope of the invention.

What is claimed is:

1. A locking device for portable computers comprising, a base tray;

a removable locking member coupled to the base tray, the removable locking member comprising a front assembly, the front assembly comprising a locking mechanism, a lock mechanism housing and at least one guide pin; and an adjustable security member coupled to the removable locking member;

wherein the lock mechanism housing is comprised of a plurality of apertures for coupling the adjustable security member to the removable locking member.

2. The device in accordance with claim 1 wherein the base tray comprises:

a mounting plenum;

an extension plenum coupled to the mounting plenum;

a plurality of side walls coupled to the mounting plenum; and a rear wall coupled to the mounting plenum.

3. The device in accordance with claim 2 wherein the base tray is further comprised of a reinforcement channel coupled to the mounting plenum and to the extension plenum.

4. The device in accordance with claim 2 wherein the mounting plenum is comprised of a plurality of apertures for securing the device to a permanent structure.

5. The device in accordance with claim 2 wherein the extension plenum is comprised of at least one aperture.

6. The device in accordance with claim 2 wherein at least one of the plurality of side walls is comprised of at least one aperture.

7. The device in accordance with claim 2 wherein the rear wall is comprised of at least one aperture.

8. The device in accordance with claim 1 wherein the removable locking member further comprises:

a rear flange for coupling with the base tray;

a rear vertical section having a plurality of apertures for coupling with the adjustable security member; and a horizontal section which couples the front assembly to the rear vertical section and the rear flange.

9. The device in accordance with claim 8 wherein the removable locking member further comprises a cushion material coupled to the, horizontal section.

10. The device in accordance with claim 8 wherein the plurality of apertures for coupling with the adjustable security member is comprised of two columns of equally spaced apertures.

11. The device in accordance with claim 8 wherein the locking mechanism is comprises:

a key operated lock; and a locking arm coupled to the key operated lock.

12. The device in accordance with claim 11 wherein the key operated lock has a locked position and an unlocked position.

13. The device in accordance with claim 12 wherein the locking arm engages the base tray when the key operated lock is in the locked position.

14. The device in accordance with claim 12 wherein the locking arm disengages the base tray when the key operated lock is in the unlocked position.

15. The device in accordance with claim 1 wherein the adjustable security member comprises:

at least one rear flange for coupling to a rear vertical section of the removable locking member;

a front vertical section for coupling to the front assembly of the removable locking member; and a horizontal retainer section which couples the at least one rear flange to the front vertical section.

16. The device in accordance with claim 15 wherein the adjustable security member further comprises a cushion material coupled to the horizontal retainer section.

17. The device in accordance with claim 15 wherein the horizontal retainer section of the adjustable security member is parallel to a top surface of the base tray.

18. The device in accordance with claim 17 wherein a distance between the horizontal retainer section of the adjustable security member and the base tray is adjustable.

19. The device in accordance with claim 15 wherein the front vertical section is coupled to the front assembly of the removable locking member by means of a fastener.

20. A locking device for portable computers comprising:

a base tray comprising a top and bottom surface;

a removable locking member coupled to the base tray comprising:

a horizontal section coupled to a locking mechanism that is parallel to the top surface of the base tray; and a front assembly, the front assembly comprising the locking mechanism, a lock mechanism housing and at least one guide pin; and an adjustable security member coupled to the removable locking member wherein the lock mechanism housing is comprised of a plurality of apertures for coupling the adjustable security member to the removable locking member.

21. The device in accordance with claim 20 wherein the base tray further comprises a plurality of apertures which allow the base tray to be coupled to a permanent structure by fasteners.

22. The device in accordance with claim 20 wherein the portable computer is secured to the locking device by the steps of:

placing the portable computer on the top surface of the base tray;

coupling the adjustable security member to the removable locking member such that a distance between the adjustable security member and the top surface of the base tray is approximately the same as a height of the portable computer;

coupling a rear section of the removable locking member to the base tray; and locking a front section of the removable locking member to the base tray.

* * * * *